United States Patent
Aurongzeb et al.

(10) Patent No.: US 11,107,440 B2
(45) Date of Patent: Aug. 31, 2021

(54) SYSTEM AND METHOD FOR DYNAMIC BACKLIGHT AND AMBIENT LIGHT SENSOR CONTROL MANAGEMENT WITH SEMI-SUPERVISED MACHINE LEARNING FOR DIGITAL DISPLAY OPERATION

(71) Applicant: Dell Products, LP, Round Rock, TX (US)

(72) Inventors: Deeder M. Aurongzeb, Austin, TX (US); Asim M. Siddiqui, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/196,856

(22) Filed: Nov. 20, 2018

(65) Prior Publication Data

US 2020/0160813 A1    May 21, 2020

(51) Int. Cl.
  *G09G 3/34* (2006.01)
  *G09G 5/10* (2006.01)
  *G09G 5/00* (2006.01)
  *H04W 4/30* (2018.01)

(52) U.S. Cl.
  CPC .............. *G09G 5/10* (2013.01); *G09G 5/006* (2013.01); *H04W 4/30* (2018.02); *G09G 2320/0233* (2013.01); *G09G 2320/066* (2013.01); *G09G 2320/0653* (2013.01); *G09G 2360/144* (2013.01)

(58) Field of Classification Search
  CPC ........... G09G 5/006; G09G 2320/0233; G09G 2320/0653; G09G 2320/0693; G09G 2360/144; G09G 3/3406; G09G 3/3413; G09G 3/342; G09G 3/34
  See application file for complete search history.

(56) References Cited

U.S. PATENT DOCUMENTS

| 2014/0285477 A1* | 9/2014 | Cho ......................... G09G 5/02 345/207 |
| 2014/0375696 A1* | 12/2014 | Chuang ................ G09G 3/3406 345/690 |
| 2017/0110065 A1* | 4/2017 | Zhang .................. G09G 3/2018 |

\* cited by examiner

*Primary Examiner* — Dennis P Joseph
(74) *Attorney, Agent, or Firm* — Prol Intellectual Property Law, PLLC; H. Kenneth Prol

(57) ABSTRACT

A method of operating or an information handling system operating a dynamic backlight and ambient light sensor (DBL and ALS) brightness control management system comprising a digital display having a selectable brightness level, a processor operatively connected to the digital display for executing code instructions of a dynamic backlight (DBL) control system for modifying brightness levels of some or all portions of the display screen in response to inputs relating to display content type and associated optimal contrast levels for the display content and the processor executing code instructions of an ambient light sensor (ALS) control system to modify brightness levels of some or all portions of the display screen in response to detected ambient light levels of the information handling system where the processor executing code instructions of the DBL and ALS brightness control management system adjusts operation of either the DBL control system or the ALS control system based on location or detected ambient light levels and wherein the adjustment to the DBL control system or the ALS control system prevents interfering impact by both systems.

20 Claims, 6 Drawing Sheets

SYSTEM AND METHOD FOR DYNAMIC BACKLIGHT AND AMBIENT LIGHT SENSOR CONTROL MANAGEMENT WITH SEMI-SUPERVISED MACHINE LEARNING FOR DIGITAL DISPLAY OPERATION

FIELD OF THE DISCLOSURE

The present disclosure generally relates to information handling systems, and more particularly relates to a system and method of contextually managing digital display brightness adjustments under dynamic backlight (DBL) and ambient light sensor (ALS) controls.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, information handling system 100 can be a personal computer, a laptop computer, a smart phone, a tablet device, or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. The information handling system may include random access memory (RAM), ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities. Additionally, the information handling system may include a digital display device which may have one or more brightness control systems applying brightness adjustments.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
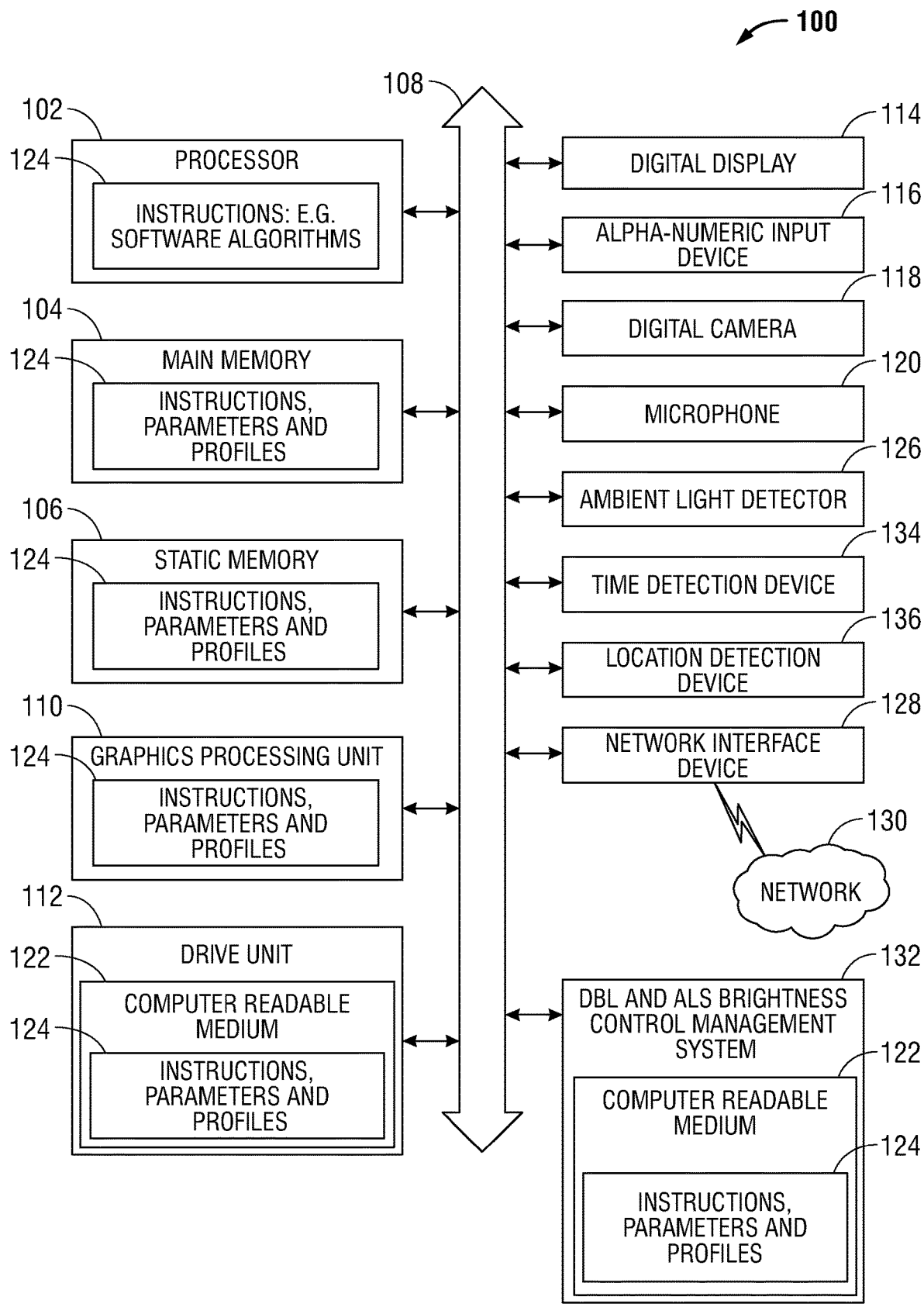
FIG. 1 illustrates a generalized embodiment of an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Changes in the brightness of a display screen, via backlighting brightness levels for example, may be automatically controlled in many current information handling systems. For example, one or more types of backlighting brightness control may be implemented on information handling systems to conserve power consumption by the display screen system. This may be particularly important for mobile information handling systems which may rely, at least in part, on battery power. In other embodiments, backlighting or other brightness controls may be implemented to provide an optimal front-of-screen (FOS) experience for a user. For example, varied ambient lighting conditions may require different brightness levels to allow for comfortable viewing of the digital display screen. Two types of display brightness controls may be implemented in some embodiments.

In one example, dynamic backlight control (DBL control), such as Dell® Dynamic Backlight/Brightness Control (DBC) may be employed to control display screen brightness levels. The DBL control system may change display brightness levels depending on content shown on the screen. The DBL control systems may determine display content to adjust dynamically brightness levels depending on average intensity levels or other factors, such as motion and video, to be displayed in the display content to enhance the FOS viewing experience or to trim power consumption depending on circumstances. The DBL control systems may even control light output within cells or clusters of cells and control may provide for improved contrast ratios for some display content, while other content does not need as stark contrast ratios. This content-aware brightness control may alter screen brightness levels in increments depending on display screen capabilities such as maximum brightness levels and available increment steps for brightness changes of a display screen. For example, display screen may have maximum brightness levels ranging from 200-500 nits. Further, various incremental brightness adjustment controls may be available for certain display screens.

In another embodiment, information handling systems may be deployed with ambient light sensors or detectors to detect light levels of an information handling system. The ambient light sensor (ALS) control system may operate to detect high levels of ambient light around the information handling system, such as when a mobile information handling system has been brought outside in a sunny environment. Sometimes the ALS control system may be referred to as an adaptive brightness control based on detected ambient light levels. The ALS control system will detect the ambient light level and determine in some cases that the screen needs to be brightened to be viewable such as in bright ambient light conditions. In other aspects, such as in darkened rooms, digital display brightness may be dimmed considerably to improve viewability. One or more thresholds of light levels may be sensed and cause a brightness adjustment response by the ALS control system. In some cases, the ALS control system adjustments may be a 20% or more reduction of display backlighting brightness from digital display brightness levels for normal indoor room ambient lighting levels when a darkened ambient lighting level is detected. Similarly, a 20% or more increase in display backlighting brightness may occur above that brightness level used at normal indoor room ambient lighting levels when transitioning to a bright environment. In an example embodiment, a normal indoor room ambient light level may be a range around 300 lux+/−100 lux. Other ranges are contemplated as a normal indoor ambient light level range in various embodiments. In one aspect however, a detected ambient light level of 200 lux or lower may act as one threshold level to trigger a display screen brightness decrease. In another aspect, a detected ambient light level of 400 lux or higher may act as another threshold to trigger a display brightness screen increase in an example ALS control system function. It is understood that any threshold levels may be selected, and the thresholds may be much closer to a mid-range 300 lux level or much further from the 300 lux level in example embodiments. There may also be stepped or multiple thresholds for dimming or increasing brightness levels by the ALS control system from brightness levels of a digital display in normal room ambient light levels. In other aspect, high and low threshold ambient light levels may not be symmetrically separated from 300 lux or other mid-range normal ambient light level by the ALS control system in various embodiments.

It is noted that operation of both the DBL control system (or DBC) and ALS control system may be simultaneous such that these display brightness control systems may work cumulatively or against one another to cause deleterious effects on a user's front-of-screen experience. For example, both the DBL control system and ALS control system may cumulatively increase brightness causing washout, cumulatively decrease brightness to cause problematic dimming, or work against one another to dim when another control causes brightening of the display that may be needed in particular circumstances or vice-versa. A system is needed to reduce these effects. In an embodiment, a DBL and ALS brightness control management system of the present disclosure may be employed to cause minimal disruption to user experience via gradual or stepped shifting of brightness levels in accordance with a control of both the DBL control system and ALS control system operation. In yet other embodiments, shifting between operation of DBL control system and ALS control systems may be weighted according to effects of location, ambient light levels, and impact of the brightness control systems. For example, in a bright sunny environment outside, an ALS control system may have a more impactful improvement on the front-of-screen experience than a DBL control system.

In other aspects of the embodiments herein, a user may manually adjust brightness levels which may impact operation of the DBL and ALS brightness control management system described. Further, a portion of the DBL and ALS brightness control management system or a separate module of control management may operate to learn behavior trends of a user of the information handling system. For example, a semi-supervised machine learning of brightness setting behavior of a user may be implemented in some embodiments. In an aspect the DBL and ALS brightness control management system semi-supervised machine learning of brightness settings my learn a user's propensity for setting brightness to a maximum brightness and, accordingly, disable the ALS control system or even the DBL control system. In some aspects, the semi-supervised machine learning of brightness control behavior may learn user preferences based on habits or repeated re-settings to a brightness level, duration of use at a brightness level, or simply by the user selecting a max brightness setting.

Examples are set forth below with respect to particular aspects of an information handling system for limiting one or several brightness control systems for a digital display device or plural digital display devices.

FIG. 1 illustrates an information handling system 100 similar to information handling systems according to several aspects and embodiments of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules described above and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. The information handling system 100 may further include as another processor a graphics processing unit (GPU) 110 operating to control the brightness and spectral characteristics of a digital display device 114, including the digital display pixel compensation as well as brightness levels of backlighting or other brightness control for one or more pixels in the digital display device 114. Any of the processing resources may operate to execute code that is either firmware or software code. Moreover, the information handling system 100 can include memory such as main memory 104, static memory 106, and drive unit 112 (volatile (e.g. random-access memory, etc.), nonvolatile (read-only memory, flash memory etc.) or any combination thereof) having computer readable medium 122. The computer readable medium 122 may store code instructions 124 including those of the dynamic backlight (DBL) and ambient light sensor (ALS) brightness control management system 132. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include one or more digital displays 114. The digital display(s) 114 in an embodiment may function as a liquid crystal display (LCD), an organic light emitting diode (OLED), a flat panel display, a solid state display, or a cathode ray tube (CRT). In some embodiments, the information handling system 100 may include a plurality of digital displays or a single, foldable digital display across two display housings. The information handling system may have a form factor of having a foldable single or two or more digital display screens with various available orientations. The information handling system 100 may include an ambient light detector 126 which may also be referred to as an ambient light sensor herein. Additionally, the information handling system 100 may include an input device 116, such as an alpha-numeric keyboard, a cursor control device, touchpad, or gesture or touch screen input, and a microphone 120. Brightness levels of the digital display or displays 114 may be controlled on a pixel by pixel level or in clusters of pixels. Power levels for backlighting or OLED cells may be varied in embodiments to control brightness levels according to embodiments herein.

The information handling system can include a digital camera 118 to capture images in the information handling system, such as an RGB camera, an infrared digital camera, a telephoto lens digital camera, a fish-eye digital camera, a wide-angle digital camera, a close-focus digital camera, an array camera such as a CMOS array camera or an array camera composed of other light sensors, or any other type of two-dimensional digital camera. The information handling system can also include two-dimensional RGB camera as well as a three-dimensional (3-D) camera.

The information handling system can also include a time detection device 134, and a location detection device 136. A time detection device 134 may include a clock, calendar, internal chronometer, or other timing device. A location detection device 136 may include any form of location detection circuitry, including, but not limited to a Global Navigation Satellite System such as a Global Position System (GPS) Receiver, IEEE 802.11 transceiver circuitry, or other location detection circuitry.

Network interface device 128 represents a NIC disposed within information handling system 100, on a main circuit board of the information handling system, integrated onto another component such as processor 102, in another suitable location, or a combination thereof. The network interface device 128 can include another information handling system, a data storage system, another network, a grid management system, another suitable resource, or a combination thereof. Network interface device 128 in an embodiment may operably connect to a network 130 and may be wireless or wired.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of code instructions 124 that can be executed to cause the computer system to perform any one or more of the methods or computer based functions disclosed herein. For example, information handling system 100 includes one or more application programs 124, and Basic Input/Output System and Firmware (BIOS/FW) code instructions 124. BIOS/FW code instructions 124 function to initialize information handling system 100 on power up, to launch an operating system, and to manage input and output interactions between the operating system and the other elements of information handling system 100. In a particular embodiment, BIOS/FW code instructions 124 reside in main memory 104 and include machine-executable code that is executed by processor 102 to perform various functions of information handling system 100. In another embodiment, application programs and BIOS/FW code reside in another storage medium of information handling system 100. For example, application programs and BIOS/FW code can reside in static memory 106, drive 120, in a ROM (not illustrated) associated with information handling system 100 or other memory. Other options include application programs and BIOS/FW code sourced from remote locations, for example via a hypervisor or other system, that may be associated with various devices of information handling system 100 partially in main memory 104, static memory 106, drive unit 112 or in a storage system (not illustrated) associated with network interface device 128 or any combination thereof.

The information handling system 100 can include a set of instructions 124 that can be executed to cause the computer system to perform any one or more of the methods or computer based functions disclosed herein. For example, instructions 124 may execute a DBL and ALS brightness control management system 132, software agents, or other aspects or components including a separate DBL controls system and an ALS control system. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

In an example of the present disclosure, the processor 102, the graphics processing unit 110, or some combination of the CPU and GPU may execute code instructions of the DBL and ALS brightness control management system 132 as disclosed herein, and an API may enable interaction between the application program and device drivers and other aspects of the information handling system and a DBL and ALS brightness control management system 132 thereon. In one example embodiment, the GPU 110 or digital display device drivers and controllers may conduct calculation of determination of external lighting conditions or location to trigger a shift of activation of power brightness control systems such as the dynamic backlight control and ambient light sensor adjustments from operating in conflicting manner for application to displayed images by the digital display or displays 114. Several of the inputs may be received by the DBL and ALS brightness control management system 132 operating on the GPU in such an embodiment to manage timed, gradual or stepped shift of DBL control or ALS control adjustments for the brightness levels of a digital display. Adjustments to the DBL control of ALS control adjustments may depend on factors such as location or ambient light levels and managed by the DBL and ALS brightness control management system. In other embodiments, some or all of the DBL and ALS brightness control management system 132 may operate as a set of code instructions in software, firmware or hardwired to execute any portion of the determination that a modification to the operation of either or both of the DBL control and the ALS control adjustments to brightness control may be triggered. For example, some or all of one or the other brightness control system may be impeded by the DBL and ALS brightness control management system. In an example embodiment, the pre-set conditions for triggering a disengagement of the dynamic backlight system or the ambient light system to reduce or eliminate the effect of either system on brightness intensity for at least a portion of the pixels may be stored in a brightness control file. Determination of the inputs and conditions may also trigger a shift between the DBL control system or the ALS control system in another example embodiment. Operation of some or all of the DBL and ALS brightness control management system may be conducted via an application program or firmware executed by a CPU 102 or other controller or processor or combinations of the same. In some example embodiments, the GPU 110 may nonetheless conduct the brightness control shifting along with display drivers as understood by those of skill. In a further aspect, the information handling system 100 may operate as a standalone device or may be connected, such as via a network, to other computer systems or peripheral devices which may in some embodiments conduct aspects of the DBL and ALS brightness control management system 132 and other embodiments described herein.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The DBL and ALS brightness control management system 132 may include a computer-readable medium 122 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The DBL and ALS brightness control management system 132 computer readable medium 122 may also contain space for data storage, such as an internal data record for an ambient light level threshold and adjustment control table for implementation of adjustments to either or both the DBL control system or the ALS control system. The information handling system 100 may also include a DBL and ALS brightness control management system 132 that may be operably connected to the bus 108. The DBL and ALS brightness control management system 132 may perform tasks related to shifting the brightness control effects on the digital display 114 upon the occurrence of a preset condition such as detected ambient light levels or detected locations having known lighting conditions. Detection of ambient light levels or location may be required to occur over a preset duration of time to reduce fluctuations in system operation in some embodiments. In an embodiment, the DBL and ALS brightness control management system 132 may communicate with the main memory 104, the processor 102, the GPU 110, the digital display 114, the alpha-numeric input device 116, the digital camera 118, the microphone 120, the ambient light detector 126, the time detection device 134, the location detection device 136, and the network interface device 128 via bus 108, and several forms of communication may be used, including ACPI, SMBus, or shared memory.

In other aspects, applications including the DBL and ALS brightness control management system 132 may interact with system sensor module having various orientation sensors (not shown). Various orientation sensors are included in this module to assist with determining the relative orientation of the information handling system and the orientation of one or more digital displays 114. Orientation sensors may include motion sensors, image sensors, and sound sensors 156. The sensor system module is a sensor hub, or an accumulator device, that collects raw data from connected orientation sensors, and organizes and processes data received from the connected sensors. Motion sensors including accelerometers and orientation sensors, image sensors and sound sensors may also be used in some embodiments to determine a location as inside or outside. The sensor hub also processes raw sensor data to groom the raw sensor data into a useable form of positional analysis for the display information handling system and its display screen or screens. Such a sensor hub may be an independent microcontroller such as the STMicro Sensor Fusion MCU as well as other microcontroller processing systems known to persons of ordinary skill. Alternatively, it is contemplated that the sensor and fusion hub may be integrated into a core processing chipset such as CPU systems for mobile devices as available from Intel® corporation or may utilize ARM Core processors that serve as single or multiple core processors in alternative chipset systems. The sensor hub may communicate with the sensors and the main CPU processor chipset 102 via a bus 108 connection such as an Inter-Integrated Circuit (I2C) bus or other suitable type of multi-master bus connection.

A relative orientation of the information handling system in space, the orientation of the one or more digital displays 114 with respect to one another, consideration of state of usage activity data, and working software application context are determined by the sensor hub and may be used to determine a display orientation. This relative orientation data of the display or displays 114 of the information handling system 100, the state of usage activity data, and the working software application context may be used by the DBL and ALS brightness control management system 132 to determine ambient light source locations, application contexts for DBL control or ALS control operation or may be used as an additional input to determine suitability for luminous intensity shifting impacts of these brightness control systems according to embodiments herein of the DBL and ALS brightness control management system 132.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
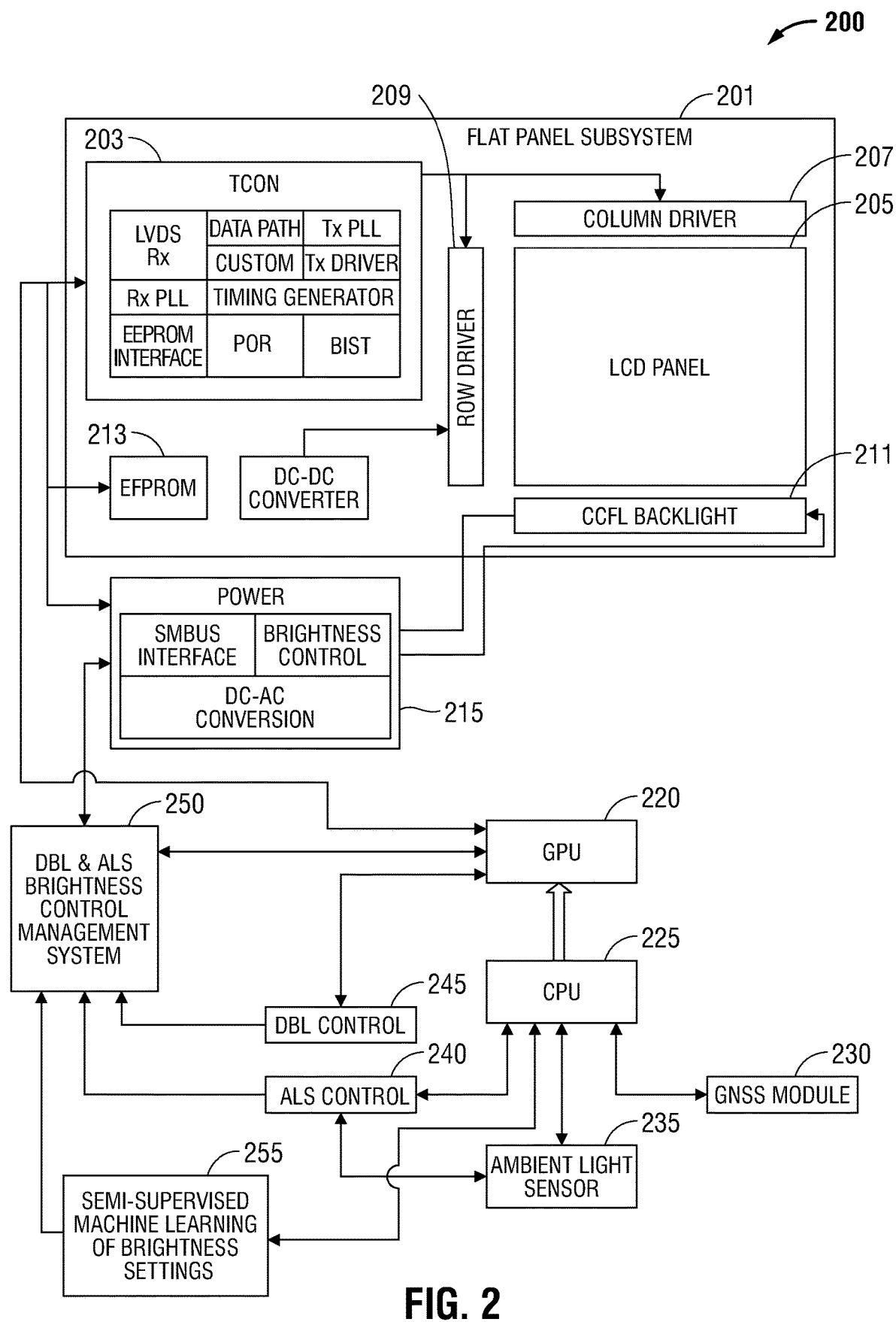
FIG. 2 is a block diagram illustrating a DBL and ALS brightness control management system according to an embodiment of the present disclosure.

FIG. 2 is a block diagram illustrating an information handling system with digital display operating a DBL and ALS brightness control management system 200 according to an embodiment of the present disclosure. In an embodiment, and as shown in FIG. 2, a DBL and ALS brightness control management system as described above in 132 may contain application modules, including, but not limited to a DBL control module 245, an ALS control module 240, the DBL and ALS brightness control management system 250 for coordinating operation of the effects of the DBL control module 245 and ALS control module 240, and a semi-supervised machine learning of brightness settings module 255 in various embodiments. As described above, the information handling system may include one or more buses operable to transmit communications between the various hardware components. For example, such as communications between the DBL and ALS brightness control management system 250 operating on CPU 220 or GPU 225 and managing the DBL control 245 and ALS control 240 may occur with various components via one or more bus systems. Communications between the DBL and ALS brightness control management system 250 operating on GPU 220, for example, may occur with any one of the digital display device 201, the backlight power control 215 or other brightness control system, the GNSS module 230, the ambient light detector 235 (also referred to as an ambient light sensor), as well as other devices including time detection device, other location detection devices, a network interface device, or other sensors and components of an information handling system or operatively coupled thereto but not shown in FIG. 2.

In an embodiment, the DBL and ALS brightness control management system 250 operating on GPU 220 may interface with various components of a digital display device 201. For example, the DBL and ALS brightness control management system 250 may communicate with the digital display controller or timing controller (TCON) 203 in an LCD system for an LCD panel 205 with backlight control 215 for a backlight 211. The timing controller may serve multiple functions including receiver for LVDS or RSDS data from a GPU 220 and may include a receiver and transmitter phase lock loop (PLL) for synchronization of data received from a GPU 220 and transmitted to an LCD panel 205 and column and row drivers 207 and 209. Similarly, a data path to an LCD panel interface for communication to the column and row drivers may operate along with pixel formatting, buffering and a timing generator for display data timing operation purposes in TCON 203. The digital display controller, for example the TCON 203, may also have a control and interface to memory such as EEPROM memory 213 as well as interface to bus connections or control lines such as an SMBus, GPIO, I2C, or SPI Bus. Additional capability of the TCON 203 may include power on reset (POR), built-in self-test functionality (BIST) and other features common to a digital display controller or TCON 203.

Further, TCON 203 may also have control or an interface with a backlight power system with controller 215. For example, an SMBus interface may enable an interface to the backlight power system and control 215. The back light power system and control may provide for brightness control and alternating current and direct current (DC-AC) conversion for providing power to a backlight such as cold cathode florescent lamp (CCFL) back light 211. It is understood that may forms of backlighting may be used for LCD backlighting including light emitting diode (LED) backlighting or brightness control for organic LED (OLED) systems. For example, the OLED cells may provide variable brightness internal to the display panel. Brightness control may nonetheless be managed via brightness control system for OLED cell brightness levels, LED backlighting, CCFL backlighting or other forms of backlighting.

The DBL control module 245, ALS control module 240, and the DBL and ALS brightness control management system 250 may further receive data relating to ambient light levels detected by ambient light sensor or detector 235 or physical location data detected by a GNSS system 230. For example, a GPS system may be used as GNSS system 230. Additionally, the DBL and ALS brightness control management system 250 may also receive an indication of backlight brightness capabilities of digital display screen including sensitivity levels for brightness adjustments of the DBL control module 245 and the ALS control module 240. Further data input into the DBL and ALS brightness control management system 250 may include power status information and power consumption rate information in some embodiments.

As described in embodiments herein, the DBL and ALS brightness control management system 250 will manage the brightness control adjustments implemented by the DBL control module 245 and ALS control module 240. As described, in ambient light situations above or below certain threshold levels in example embodiments, the cumulative impact of the DBL control module 245 and the ALS control module 240 may be detrimental to a user's front of screen experience. In other words, dimming may occur or added brightness may occur above various thresholds to cause an overly dim screen or a screen that is too bright in parts or over the whole display panel 205. Extreme ambient lighting conditions may be commonly encountered depending on location as well. For example, high brightness ambient light conditions may be encountered outdoors, such as in direct sun. In other example, extremely low-light ambient light conditions may be encountered outdoors at different times of the day. Additionally, low-light ambient light conditions may be encountered by users with frequency at indoor locations in many use scenarios while at other times normal range lighting conditions may be frequently encountered at indoor locations. Accordingly, in some embodiments, location may be utilized as a factor According to various embodiments, a number of transitions to reduce the effect of either the DBL control module 245 or the ALS control module 240 may be implemented.

In yet another aspect, a user may manually adjust brightness levels which may impact operation of the DBL and ALS brightness control management system described. Further, a portion of the DBL and ALS brightness control management system or a separate module of control management may operate to learn behavior trends of a user of the information handling system. For example, a semi-supervised machine learning of brightness setting behavior of a user may be implemented in some embodiments as described. The DBL and ALS brightness control management system semi-supervised machine learning of brightness settings may learn user settings for brightness that are manually set to adjust to desired brightness levels at certain locations or when certain ambient light levels are present. In one example, setting to a maximum brightness may then cause the DBL and ALS brightness control management system to disable the ALS control system or even the DBL control system. The semi-supervised machine learning of brightness control behavior may learn user preferences based on habits of the user such as repeated re-settings to a particular brightness level at a location or under certain conditions such as ambient light levels or with certain applications operating. In another example embodiment, semi-supervised machine learning may use duration of use of the information handling system at a brightness level as an indication of factors for probability that the set brightness level provides a preferred front of screen experience for a user. Additionally, in some embodiments, simply the user selecting a brightness setting may cause the DBL and ALS brightness control management system to yield to the selected preference and disable one or both of the DBL control system or the ALS control system.

In an example embodiment of semi-supervised machine learning some parameters may be labeled parameters learned by the semi-supervised machine learning of brightness settings such as a user selecting a particular brightness level, for example a maximum brightness level. Additional supervised learning aspects may include indication of a schedule for a user for location in some embodiments. For one example embodiment, the DBL and ALS brightness control management system and the semi-supervised machine learning may know a user is normally indoors during weekdays at 10 am and set brightness, color temperatures, gamut, contrast and other factors to provide a maximum visual experience after learning this trend occurs for several days in a row. In one embodiment, three days may indicate this supervised or labelled factors. However, this may be incorrect on weekends when a user is not at work. Outdoors may be more common at 10 am on weekends. In other embodiments, any schedule may be relevant. The information handling system may have pre-set weights of effects by either the ALS control system and DBL control system as managed by the DBL and ALS brightness control management system in some embodiments as described herein. These pre-set weights for activity of the ALS control system and the DBL control system may be influenced by supervised learning of expected locations or ambient conditions and operating applications. Operating conditions may include types of applications operating and needs of images to be displayed, battery states, and processor speeds or needs of processor speeds to operate the images and applications.

However, in other aspects unsupervised learning methods may involved collection of many sensor or other feedback datapoints that are unlabeled but easier to acquire from sensors and not limited by pre-settings. Those unlabeled datapoints may be grouped into clusters sharing similar properties, but must be validated to ongoing learning of conditions or the environment and operation of the information handling system. The unlabeled data may be large relative to labeled data but may be used for training with improved learning accuracy when combined with the labelled data aspects but without the time and expense of supervised learning requiring all data to be labelled. Various example algorithmic approaches may be used with semi-supervised learning including Bayesian generative modelling, low-density separation techniques, graph-based models, and heuristic analysis. Bayesian analysis of probabilities that data points belong to a class may be used to determine whether a label may apply to unlabeled data or may be used as an extension of clustering with labels. Based on assumptions of data distributions in line with or parameterized by a vector value within a probability space, then if the assumptions are correct, the unlabeled data improves the learning performance as a semi-supervised machine learning algorithm. Determining the vector value assumption may be evaluated by Chain rule or other technique to verify assumptions based on conditional probabilities. Thus, this may be applied for example to factors of labelled and unlabeled data at nodes to impact classification for improved FOS experience when weighting is applied by the DBL and ALS brightness control management system to control impact of the DBL control system or the ALS control system as well as the impact of manual settings in certain conditions.

As another example, heuristic approaches to self-labelling to make use of unlabeled data within a supervised learning algorithm. Both labelled and unlabeled data examples inform a selection of distance metric or kernel for data in an unsupervised step. For example, a supervised learning algorithm such as classifier for brightness levels or weighting of the ALS control or the DBL control systems may be trained with labelled data and then applied to unlabeled data as well and confidence rating applied. Other examples of semi-supervised machine learning may include graph representations of the data where labeled and unlabeled examples may be assigned to nodes and a graph constructed using known domain principles or example similarities. Then connection of data points to nearest neighbors or within some distance may establish edges between datapoints. The edges may be assigned weights. Operations such as manifold regularization may be used to classify data to functions for learning in a data set to extend the supervised learning algorithms to be applicable to unlabeled data. With these algorithms, classifiers may be established or trained to incorporate some labeled data as well as unlabeled data to provide a semi-supervised machine learning framework to impact on brightness controls a managed by the DBL and ALS brightness control management system as well as adjustments to color temperature, gamut, contrast and other adjustments to the color compensation of the digital display screen in various operating circumstances and ambient light conditions.

With semi-supervised machine learning of brightness settings, impact on labeled settings from a user selection, schedule, or the like may be combined with the advantages of also integrating and guiding the process of utilizing unlabeled data collections of ambient conditions and operating applications to alter brightness as well as manage color temperature, gamut to optimize both FOS experience as well as battery and speed optimization of the information handling system.

Figure 3:
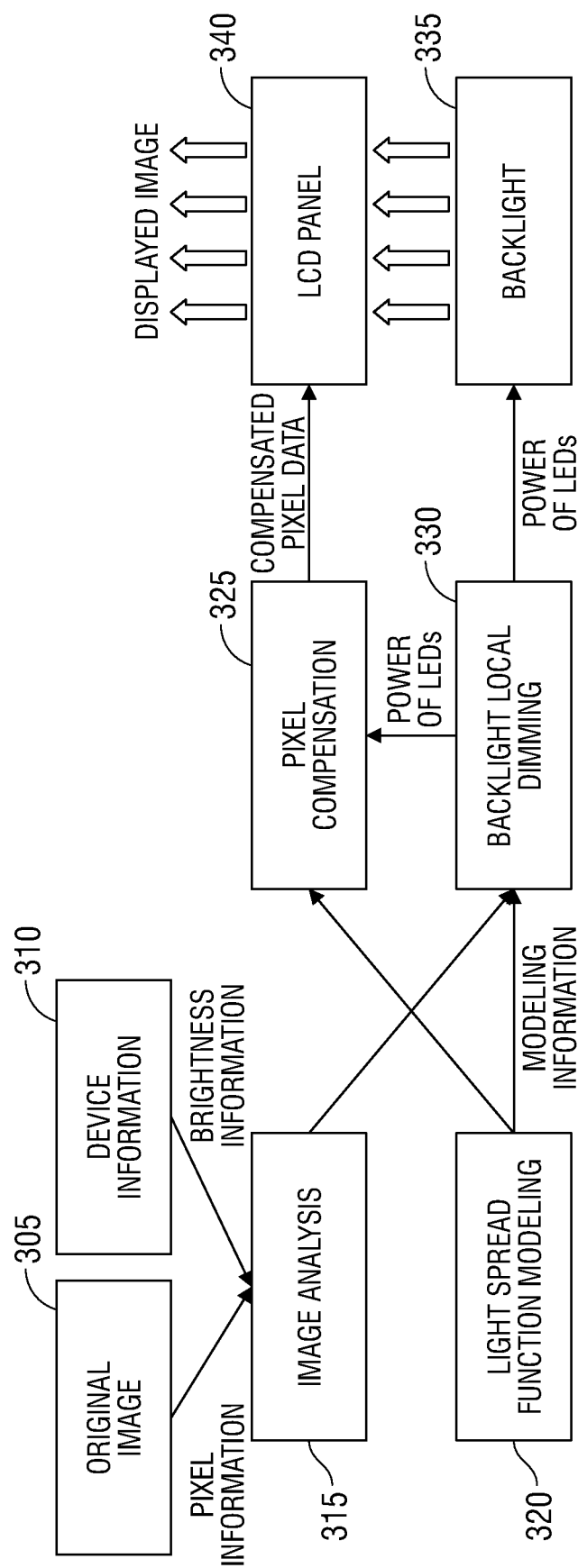
FIG. 3 is a block diagram of a DBL control system for display brightness according to an embodiment of the present disclosure.

FIG. 3 is an example DBL control system to illustrate the operation of the dynamic backlight control based on control relevant to contextual factors of a software application providing images to be displayed on a digital display screen. Dynamic backlight controls operate to maximize the energy savings by controlling brightness levels depending on content displayed. Some content to be displayed, i.e. image data, does not need to be displayed at a higher brightness which may cause substantial energy loss especially during operation on battery power. Differences in majority tone or colors displayed in images may cause dynamic adjustment to brightness (or tone, color temperature, gamut, contrast, or the like) levels of the display or portions of the display in pixel groups or zones of the image to be displayed. The DBL control system may operate in firmware or software control on the information handling system and access brightness control drivers for the digital display screen. In some example embodiments, the brightness control may include backlight power control. In other embodiments, the methods herein may be applied to control brightness in other types of digital display systems, such as OLED digital display systems, which have differing brightness sources other than backlighting.

The DBL control system shown in FIG. 3 may include an image analysis engine 315 for analysis of content to be displayed. Pixel information of an original image 305 for content to be displayed may be input into the image analysis engine 315. Additionally, features of the digital display device or device information 310 may also be input into the image analysis engine 315. The device information 310 may include aspects of the operational capabilities of the digital display device including maximum brightness panel output levels (e.g., max nits output), operational output brightness levels in typical operation conditions since display panels are not typically run at full maximum, number of backlight segments, or steps of available brightness level changes within a panel brightness output range. Further, device information may also include data on open loop settling time for brightness transitions through numbers of steps and contrast ratio capabilities of the digital display screen which may also impact dynamic range of brightness available on the digital display screen. The open loop settling time may be a factory setting that is an aspect of noticeability of transitions identified for a particular digital display screen type. In other embodiments, open loop settling time may be a dynamic factor depending on the type of content expected to be displayed. In addition, the open loop settling time may also be a custom setting option in some embodiments that is selected depending on the tolerance or preference of a user for brightness transitions and their noticeability.

The DBL control system of FIG. 3 utilizes the image analysis 315 of content to be displayed such as original image 305 and device information 310 to determine the nature of the image. For example, predominant colors to be displayed in portions or across the display screen, motion of the image such as in a video, and similar aspects may determine factors of the image analysis at 315. The DBL control system takes the image analysis 315, and in connection with the light spreading function model 320, applies alteration to backlight dimming 330 at pixels or location of pixel groups. The DBL control system may also provide for pixel compensation 325 that works in connection with the backlight power level data. Backlight dimming control 330 resulting from the content aware backlight control of the DBL control system is applied to the backlight module 335 or other digital display panel brightness control. Pixel compensation data is provided to the liquid crystal display panel with the pixel information provided via the GPU and display drivers such as with the timing controllers and other digital display control systems as applicable. The result is a displayed image that may be dynamically controlled as to brightness and tone depending on the determined content to be displayed relative to colors displayed, type of display data, dynamics of displayed images, and other factors. The display controls may include adjustments to more than just brightness in an example embodiment. Changes to color temperature, gamut, contrast, or the like may also be adjusted to improve FOS experience. However, as described herein, operation of the DBL control may clash with operation of other brightness control systems that automatically control brightness levels due to other factors. For example, the ALS control system working to control brightness based on detected ambient light levels may operate to cumulatively over-reduce brightness or under-increase brightness of a digital display screen under various circumstances. This can result in undesirable user front of screen experiences. The displayed image under the influence of two brightness controls may be too dim to view in some aspects or may have a washout effect in other aspects with respect to some or all of the displayed pixels of the image or images displayed. This may be referred to as over or under saturation. In yet other aspects, the dynamic changes to brightness being imposed upon the digital display screen may not be gradual enough. A noticeability aspect of one or the other automatic brightness controls being implements or disengaged, whether partially or completely, may create an undesirable front of screen experience as well. Aspects of the presently disclosed embodiments address this with the DBL and ALS brightness control management system.

Figure 4:
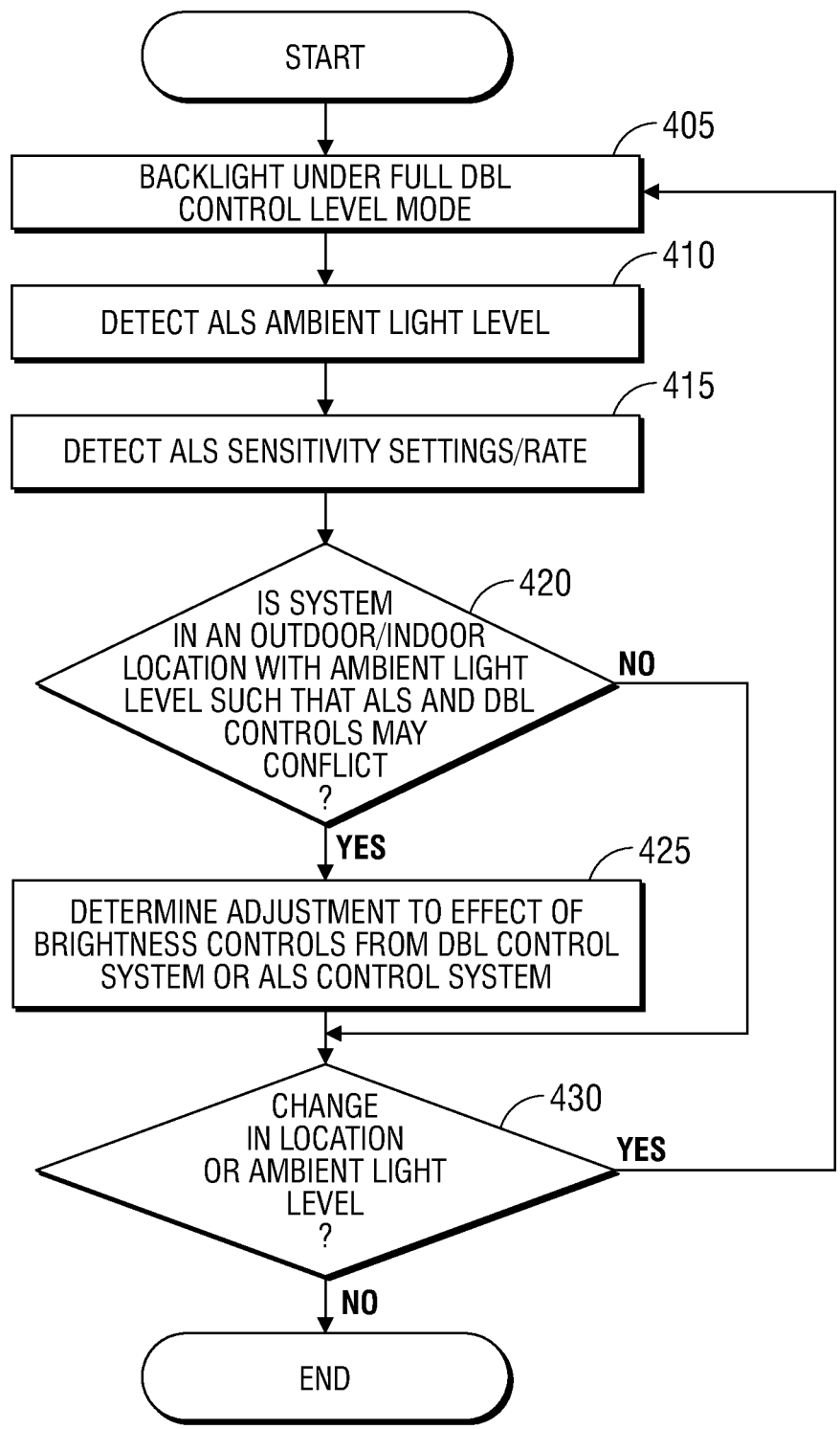
FIG. 4 is a flow diagram illustrating a method for managing brightness controls between a DBL control system and an ALS control system according to an embodiment of the present disclosure.

FIG. 4 is a flow diagram of an operation of the DBL and ALS brightness control management system according to an embodiment of the present disclosure. The information handling system operating a digital display device or operatively coupled to a digital display device begins by determining a status of a DBL control system operation. In one example embodiment, the content aware dynamic control by the DBL control system of the backlight power system or other brightness source operates at a full operation mode at 405. In an example embodiment, the DBL control system may operate to adjust brightness and tone with backlight dimming or increased brightness as well as pixel color compensation depending upon an analysis of image data to be displayed and application of a light spread function model applied. The DBL control is a content aware brightness and tone control of displayed information on a digital display device. The DBL control may adjust brightness levels via a backlight power control system or other brightness control system depending on the type of content to be displayed including the predominant colors or color tones to be displayed, motion of images anticipated, or other factors including the required contrast in the images to be displayed or the purpose of the application displaying images. The DBL control system may, for example, adjust the brightness level for one or more pixels of the digital display screen when a portion of the screen will predominantly display a dark hue color or is to display images requiring only a low contrast. In such examples, lower backlight levels or other brightness levels may be sufficient and dynamically implemented in some embodiments to save battery. In other aspects, a predominantly white background image, such as a word processing application, with dark letters may have sufficient contrast already available that some back light dimming may be tolerated and enable extension of battery life of a system. In yet other aspects, images requiring very high contrast to discern image details or those display images which may involve many features for display may require a higher brightness level when the system is adjusted to accommodate such images for display on the digital display device. The operational level of the DBL control system may be a factory setting in some embodiments or may be manually adjustable in other embodiments. In yet other aspects, the operational level of the DBL control system may be adjusted due to existing limitations set by the DBL and ALS brightness control management system over brightness, tone, color temperature, gamut, contrast, or the like.

The DBL and ALS brightness control management system will determine that the state of the DBL control system is at full operational mode at 405. In other aspects, the DBL control system may be off or in a partially operational mode whereby its effect has been reduced according to various embodiments herein. At 410, the DBL and ALS brightness control management system will detect an operational status of the ALS control system for brightness control in view of detected ambient light levels. In an embodiment, the DBL and ALS brightness control management system may detect an indication that an ambient light level has been detected that is of a sufficiently high or low magnitude to trigger an automatic brightness adjustment by the ALS control system. At 415, the DBL and ALS brightness control management system will determine from the ALS control system or from stored information relating to the ALS control system operating policy, the sensitivity settings and rate of brightness change that will occur depending on the detected ambient light levels. Information about the sensitivity settings and brightness change rates may include an indication of one or more detected ambient light threshold levels. For example, both high ambient light threshold levels and low ambient light threshold levels may be received indicating trigger levels for a brightness change by the ALS control system. Further, the DBL and ALS brightness control management system may collect information on how much brightness level change to expect when ambient light levels reach or surpass either a high or low ambient light level threshold. In yet another aspect, the DBL and ALS brightness control management system may also determine from rate settings of the ALS control system how quickly and how many steps of change will occur when the ALS control system is triggered to alter the brightness levels. For example, the ALS control system may make a gradual change over a specified amount of time in some settings or a quick adjustment to brightness levels in other embodiments. Additionally, a change in brightness level may depend upon how much ambient light is detected and may be an amount related to how much the detected ambient light level surpasses either a high or low threshold level or may involve several stepped high and low ambient light level thresholds associated with stepped brightness adjustments amounts. Finally, an open loop settling time may also indicate how quickly and noticeably the transition of brightness levels can occur.

In an aspect, a first high ambient light level may be selected as a first high ALS control threshold level and a first low ambient light level may be set as a first low ALS control threshold level in an ALS control system. This range between the high ALS control threshold and low ALS control threshold may determine bounds of a normal operation ambient light range within which the ALS control system does not adjust brightness levels of the digital display device. This normal operational ambient light range may be determined or set in the ALS control system and specific to operation of a digital display device in a regular indoor environment having a normal lighting level with an average range of ambient light levels. In an example embodiment, a normal room may have a lighting level or illuminance of around 300 lux with a range extending above or below this level. Any normal room illuminance level may be designated. For example, a normal room level may be based on an illuminance ambient light level of anywhere from 150 lux to 400 lux in some other embodiments. The bounds of a range for an ALS control high threshold to adjust brightness up may be set at 1000 lux in some embodiments. In other embodiments, ALS control high threshold levels may be substantially higher, such as level of 5000 lux which may be a level unlikely encountered in an indoor environment. A high level threshold may increase a digital display panel output level up to a maximum display nit output level or may increase to one or more set display nit output levels depending on the detected ambient light. In many embodiments, the ALS control system will have a discrete brightness level change that may be gradually met. In other embodiments, the brightness level change by the ALS control system may be a fast transition. Outdoor daylight levels may range from around 1000 lux for an overcast daylight level to 10,000 lux in full daylight. Direct sunlight levels may even reach 100,000 lux or higher. At high ambient light levels however, the DBL control may dim the digital display screen that has been ramped up by the ALS control system to accommodate the bright ambient conditions. The digital display screen may be perceived to be incapable of being bright enough in high ambient light conditions such as outdoors and the result may be a poor front of screen experience.

Low level thresholds may be ambient light levels below 150 lux or 100 lux in various aspects. Reduction of brightness levels by an ALS control detecting a low threshold ambient light level may reduce brightness by about 20% or more depending on how far below the detect ambient light level is from the low threshold. At low ambient light levels, for example, the DBL control may further dim the digital display screen that has already been dimmed by the ALS control system. The result may again be a poor front of screen experience.

In yet another aspect, the operation level of the DBL control system and the ALS control system over brightness levels may have been limited under settings selected by a user or by the DBL and ALS brightness control management system over brightness, tone, color temperature, gamut, contrast, or the like. In one example embodiment, the DBL and ALS brightness control management system may operate a semi-supervised machine learning system to determine classification of user preferences based on both labelled datasets of known aspects of information handling system operation and unlabeled datasets collected about operation and environment of the information handling system. Data in either labeled and unlabeled datasets may include information on locations or ambient light levels and anticipated conditions, operating environment including applications operating to display images, types of image requirements, battery or power statuses, necessary processing speeds for both graphics and other processing, and other aspect of the information handling system operation. This data may be included with determination of weighting, for example, of operation levels of the DBL control system received at 405 and the ALS sensitivity settings at 415. The semi-supervised machine learning for brightness may provide for settings for brightness or weighting levels of operation for brightness controls such as the DBL control system and the ALS control system in accord with determined user preference settings.

Proceeding to 420, the DBL and ALS brightness control management system may determine that the information handling system and digital display screen is at a location such that the ALS control and DBL controls may conflict. For example, the DBL and ALS brightness control management system may determine from a high detected ambient light level by an ALS sensor that outdoor daylight levels of light are occurring or from a GNSS system that the information handling system is located outside to determine at 420 that a conflict between the DBL and ALS control system may arise in one embodiment. In one embodiment, the location may be associated in a database with previously recorded ambient light levels detected by this or other information handling systems. This location history may also include time of day information. The location history may serve as some or all of a basis for determining that an ALS control system and DBL control system may be in conflict in some embodiments. In another embodiment, the DBL and ALS brightness control management system may determine from a low detected ambient light level by an ALS sensor that low light levels are occurring or from a GNSS system that the information handling system is located inside to determine at 420 that a conflict between the DBL and ALS control system may arise. Again, location history, which may include time of day information, may be used to determine if the ALS control system and DBL control system may conflict. In other aspects, a high DBL-ALS management threshold level of ambient light may be relied upon by the DBL and ALS brightness control management system in some embodiments to determine a conflict. A low DBL-ALS management threshold level of ambient light may be relied upon by the DBL and ALS brightness control management system in other embodiments to determine a conflict.

In some embodiments this high DBL-ALS management threshold be the same as the high ALS control threshold level. In other embodiments, the high DBL-ALS management threshold may be different from the high ALS control threshold. The high DBL-ALS management threshold may be lower in some embodiments to anticipate and deactivate or reduce the effect of the DBL system before the ALS control system kicks in. In other embodiments, the DBL-ALS management threshold may be higher than the high ALS control threshold such that the reduction in effect or elimination of the DBL control does not occur until the ALS control has kicked in to a certain level of increased brightness such that the DBL control system is interfering with the effect of the ALS control.

Similarly, in some embodiments the low DBL-ALS management threshold light level may be the same as the low ALS control threshold level. In other embodiments, the low DBL-ALS management threshold may be different from the low ALS control threshold. The low DBL-ALS management threshold may be higher in some embodiments to anticipate and deactivate or reduce the effect of the ALS control system before the ALS control system would kick in and affect the DBL control system at lower ambient light levels. In yet other embodiments, the low DBL-ALS management threshold may be even lower than the low ALS control threshold such that the reduction in effect or elimination of the ALS control may gradually coordinate with the ALS control taking effect at or shortly after the low ALS control level is detected and the ALS control kicks in to reduce brightness.

If no conflict between the ALS control and the DBL control is determined to likely occur from the detected conditions or location at 420, the process may proceed to 430 where the DBL and ALS brightness control management system will continue to monitor for changes in location or ambient light levels that may indicate a changed environment of display operation. If no conflict is determined, indoor operation in a normal ambient light level may be the digital display environment and the information handling system may proceed with the DBL control system operating in a full control level mode. The DBL and ALS brightness control management system may monitor until the digital display or the information handling system are powered down or enter a sleep mode. At this point the method may end.

If, however, conflict between the ALS control and the DBL control is determined to likely occur from the detected conditions or location at 420, the process may proceed to 425. At 425, the DBL and ALS brightness control management system may apply an adjustment to limit or eliminate the effect of either the DBL control system or the ALS control system in the information handling system as applied to the digital display device. In one example embodiment, it may not be desirable to have the DBL control system to operate at all in high ambient light levels such as in any outdoor environment. In such a scenario, if ambient light levels are detected that indicate an outdoor daylight setting or if the GNSS system and clock indicate an outdoor location during the daytime, the DBL and ALS brightness control management system may reduce or suspend operation of the DBL control system from affecting brightness while such as setting is detected.

In another embodiment, a low ambient light environment may be detected and dimming the screen further by the ALS control than the dynamic adjustments occurring via the DBL control may interfere with a front of screen experience. Accordingly, the effect of the ALS control system may be reduced or eliminated in such an operating environment under an embodiment of the present disclosure.

Upon implementing an adjustment to the brightness controls of either the DBL control system or the ALS control system, flow may proceed to 430. At 430, the DBL and ALS brightness control management system will continue to monitor for changes in location or changes in ambient light levels that may indicate a changed environment of the digital display. As described, the DBL and ALS brightness control management system may monitor until no change is detected and the digital display or the information handling system are powered down or enter a sleep mode. At this point the method may end. When the information handling system is operating the digital display device, the DBL and ALS brightness control management system may continue to assess status of the DBL control system and the ALS control system and then monitor for changes in the location or ambient light levels to determine if an adjustment is needed to either the DBL control system or the ALS control system due to location or ambient light level conditions.

Figure 5:
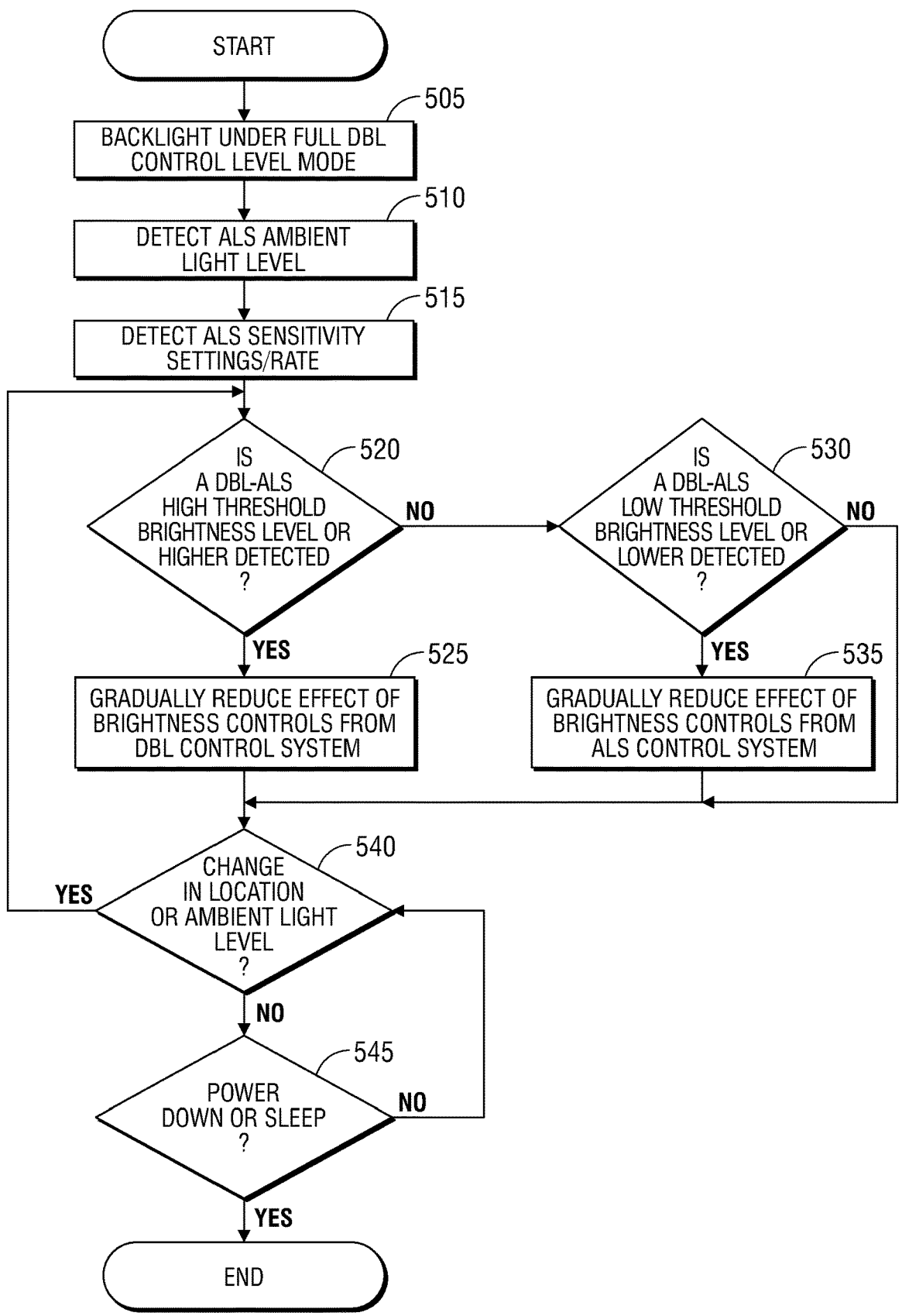
FIG. 5 is a flow diagram illustrating another method for managing brightness controls between a DBL control system and an ALS control system according to another embodiment of the present disclosure.

FIG. 5 is a flow chart illustrating another embodiment of the operation of a DBL and ALS brightness control management system. As shown in FIG. 5, the management between the competing automatic brightness control systems of the DBL control and the ALS control may not simply be an elimination of the effect of one or the other when a high or low DBL-ALS management control threshold has been met. As discussed above, the DBL and ALS brightness control management system determines the state of the DBL brightness control system at 505. In an example embodiment, the information handling system operating a digital display device or operatively coupled to a digital display device may often be detected with a backlight or other brightness source under full DBL control at 505. In an aspect, during operation of the information handling system under regular indoor lighting conditions, the content aware dynamic brightness control of the DBL control system will often be found to be in full effect. In some embodiments, the DBL control system may be manually altered or turned off in example embodiments. In such a situation, the DBL and ALS brightness control management system will detect the off status and flow may then proceed to end in an embodiment.

In example embodiments described herein, the DBL control system may operate to adjust brightness and tone with backlight driver control to dim or increase brightness depending on detected content to be displayed including its source application, required contrast levels, predominant colors displayed and other factors. The DBL control system may also implement pixel compensation depending upon an analysis of image data to be displayed and application of a light spread function model applied. The DBL control functions as a content aware brightness and tone control for displayed information on a digital display device. The DBL control may adjust brightness levels via a backlight power control system or other brightness control system depending on the type of content to be displayed including the predominant colors or color tones to be displayed, motion of images anticipated, or other factors including the required contrast in the images to be displayed or the purpose of the application displaying images. The DBL control system may, for example, adjust the brightness or tone levels for pixels across the digital display device or be tailored in some aspects to pixel groups of portions of the digital display device. Description of the DBL control system is described in various embodiments herein.

Upon the DBL and ALS brightness control management system determining the state of the DBL control system at 505 to be in full operational mode in an embodiment, the flow may proceed to 510. At 510, the DBL and ALS brightness control management system will detect an operational status of the ALS control system. As part of this status detection, an indication of detected ambient light levels from an ambient light sensor will be received. In an embodiment, the DBL and ALS brightness control management system may detect an indication that a light level for a regular indoor environment has been detected which is neither higher or lower than any thresholds to trigger ALS control brightness adjustments or thresholds that apply to the DBL and ALS brightness control management system to alter either the DBL system or the ALS control system. For example, an indication that an ambient light level has been detected that is of a sufficiently high or low magnitude to trigger an automatic brightness adjustment by the ALS control system may also be received indicating that the ALS control system is in an active status. As described in embodiments herein, an ambient light level may also be detected and used by the DBL and ALS brightness control management system to implement additional adjustments if a high or low DBL-ALS management threshold is met. The DBL-ALS management thresholds may be the same level or different than threshold trigger levels for the ALS control system in various embodiments as described.

At 515, the DBL and ALS brightness control management system will determine from the ALS control system or from stored information relating to the ALS control system operating policy, the sensitivity settings and rate of brightness change that will occur depending on the detected ambient light levels. Information about the sensitivity settings and brightness change rates may include an indication of one or more detected ambient light threshold levels to trigger a brightness change by the ALS control system. Further, the DBL and ALS brightness control management system may collect information on how much brightness level change will occur when ambient light levels reach or surpass any of a high or low ambient light level threshold. In yet another aspect, the DBL and ALS brightness control management system may also determine from rate settings of the ALS control system how quickly and how many steps of change will occur when the ALS control system triggers a brightness level adjustment. Further, there may be a plurality of thresholds, high or low, triggering steps of ALS control system brightness adjustments in some embodiments. In various embodiments herein, the ALS control system may make a gradual change over a specified amount of time in some settings or one or more quick adjustments to brightness levels in other embodiments. The behavior and parameters of the active ALS control system may be provided to the DBL and ALS brightness control management system as indications of sensitivity and change rates for brightness adjustments. Additionally, a change in brightness level may depend upon how much ambient light is detected in further embodiments. For example, brightness adjustment may be an amount related to how much the detected ambient light level surpasses either a high or low threshold level or may involve several stepped high and low ambient light level thresholds associated with stepped brightness adjustments amounts. Example ambient light levels for regular indoor ranges of operation as well as for high and low ALS control trigger are discussed in various embodiments herein.

In another aspect at 505, 510, and 515, the DBL and ALS brightness control management system may operate a semi-supervised machine learning system or operate with a separate semi-supervised machine learning system for brightness settings. The semi-supervised machine learning system for brightness settings may be used to determine classification of user preferences based on both labelled datasets of known data aspects and unlabeled datasets collected about information handling system operation, user settings, and environment of the information handling system. Data in either labeled and unlabeled datasets may include information on locations or ambient light levels and anticipated conditions, operating environment including applications operating to display images, types of image requirements, battery or power statuses, necessary processing speeds for both graphics and other processing, and other aspect of the information handling system operation. The semi-supervised machine learning system for brightness settings may also work with settings for brightness but also for color and brightness tonal aspects of the digital display screen display of images. This data may be included with determination of weighting, for example, of operation levels of the DBL control system received at 505 and the ALS sensitivity settings at 515. The semi-supervised machine learning for brightness may provide for settings for brightness or weighting levels of operation for brightness controls such as the DBL control system and the ALS control system in accord with determined user preference settings.

At 520, the DBL and ALS brightness control management system may determine whether the information handling system and digital display screen is at a location where an ambient light level is a high detected ambient light level detected by an ALS sensor such that the ALS control and DBL controls may conflict. For example, the DBL and ALS brightness control management system may determine that outdoor daylight levels of light are occurring in the environment around the information handling system or digital display screen to determine at 520 that a conflict between the DBL and ALS control system may arise due to the high ambient light levels. For example, the efforts of the ALS control system to increase brightness while the DBL control system may reduce brightness may be in conflict in one embodiment. If the DBL and ALS brightness control management system determines that the ambient light levels exceed a DBL-ALS high threshold brightness level at 520, flow may proceed to 525 to adjust the DBL control system. If the DBL and ALS brightness control management system determines that the ambient light levels do not exceed a DBL-ALS high threshold brightness level at 520, flow may proceed to 530 to determine if ambient light levels fall below a low DBL-ALS management threshold level.

In some embodiments any high DBL-ALS management threshold may be the same as the high ALS control threshold level. In other embodiments, the high DBL-ALS management threshold may be different from the high ALS control threshold. The high DBL-ALS management threshold may be lower in some embodiments to anticipate and deactivate or reduce the effect of the DBL system before the ALS control system kicks in. In other embodiments, the DBL-ALS management threshold may be higher than the high ALS control threshold such that the reduction in effect or elimination of the DBL control does not occur until the ALS control has kicked in to a certain level of increased brightness such that the DBL control system is interfering with the effect of the ALS control.

If the DBL and ALS brightness control management system determines from a low detected ambient light level by an ALS sensor that low light levels fall below the low DBL-ALS management threshold level at 530, then flow may proceed to 535 to adjust the ALS control system. If DBL and ALS brightness control management system determines from a low detected ambient light level by an ALS sensor that low light levels fall below the low DBL-ALS management threshold level at 530, then no modification may be made at this time to either the DBL control or the ALS control systems and flow may proceed to 540. At 540, the DBL and ALS brightness control management system will continue monitoring the information handling system DBL control system and ALS control system for changes in location or ambient light levels or status of activity of these brightness control systems.

Similar to the above discussion, in some embodiments the low DBL-ALS management threshold light level may be the same as the low ALS control threshold level. In other embodiments, the low DBL-ALS management threshold may be different from the low ALS control threshold. The low DBL-ALS management threshold may be higher in some embodiments to anticipate and deactivate or reduce the effect of the ALS control system before the ALS control system would kick in and affect the DBL control system at lower ambient light levels. In other embodiments, the low DBL-ALS management threshold may be even lower than the low ALS control threshold such that the reduction in effect or elimination of the ALS control may gradually coordinate with the ALS control taking effect at or shortly after the low ALS control level is detected and the ALS control kicks in to reduce brightness.

Returning to 525, the DBL and ALS brightness control management system having determined that the ambient light level detected by an ALS sensor exceeds a DBL-ALS high threshold will implement adjustments to the DBL control system to mitigate conflict between the DBL control system and the ALS control system. In the example embodiment at 525, the DBL and ALS brightness control management system may implement gradual change in reducing the effect of the DBL control system at high ambient light levels. For example, multiple high thresholds may determine a stepped down change in the effect of the DBL control system. In one example embodiment, several DLB-ALS high threshold levels of ambient light exist. Depending on the ambient light levels detected, a chart or other matrix may be accessed to determine by what percentage to reduce the effect or amount of brightness adjustments made by DBL control system. For example, if ambient light is detected at or above a first DBL-ALS high threshold such as a level of 2000 lux, the effect of a DBL control operation to lower brightness in the digital display screen may be reduced by 25% in one embodiment. Further, the more steps for the brightness reduction operation by the DBL control may be used to limit the perceptible effect of the dimming by the DBL control. In another example, if ambient light is detected at or above a second DBL-ALS high threshold such as a level of 5,000 lux, the effect of a DBL control operation to lower brightness in the digital display screen may be reduced by 75% in an embodiment. In yet another example, if ambient light is detected at or above a third DBL-ALS high threshold such as a level of 10,000 lux as with full outdoor daylight, the DBL control operation to reduce brightness in the digital display screen may be reduced by 100% or turned off in an embodiment. It is understood that any plurality of DBL-ALS high thresholds may be used that correspond to gradual step-down in effect of the DBL control system in reducing brightness. Further, the DBL-ALS high thresholds may be selected at any ambient light levels determined to have a beneficial effect on the FOS for a user of a digital display screen. The implemented thresholds and change amounts to the effect of the DBL control brightness reductions may be specific to a type of digital display screen in some embodiments. In other embodiments, the implemented thresholds or change amounts to the DBL control system effects may be specific to user sensitivity to changes to the brightness levels of the display screen in various ambient light conditions. In yet other embodiments, the control of the DBL and ALS brightness control management system may be customizable to the digital display screen or by the user.

In other aspects, change in DBL control effect may be reduced in proportion to the level that the ambient light reaches above the first DBL-ALS high threshold brightness level. This change amount may be capped at a saturation level of a detected ambient light whereby the DBL control system is automatically turned off to eliminate its effect. The proportional reduction in effect of the DBL control system in this aspect may be a linear reduction of effect in one embodiment. In another embodiment, the reduction in effect of the DBL control system may be asymptotic in that it will quickly approach complete shutdown of the DBL control system as higher levels of ambient light may be detected. The linear or asymptotic change in effect of brightness controls relative to detected ambient light levels measured beyond the DBL-ALS management threshold may be any linear or asymptotic relationship change in effects in various embodiments.

At this point, in one aspect of the present disclosure the DBL and ALS brightness control management system may revise the command from the DBL control to the back light power control system, such as 215, or to another digital display brightness control system. In another aspect, the DBL and ALS brightness control management system can merge commands of each of the DBL control system and the ALS control system into a blended brightness control command accounting for alterations in either system. This blended command may be forwarded to the back light power control system or other display brightness control. These are a couple of ways the DBL and ALS brightness control management system may reduce the effect of the DBL control system in the example embodiments.

In another aspect of the present disclosure, the DBL and ALS brightness control management system may also determine a location via GNSS or other location system when the high ambient light levels are reached in an embodiment. The DBL and ALS brightness control management system may determine from the ambient light levels, from previous visits to a location, from time of day, or some combination, that the present location is an outdoor location and brightness control adjustment is needed. Since ambient light levels may vary in outdoor conditions due to clouds, other light sources, or other sources of shadows, in an embodiment the DBL and ALS brightness control management system may settle the DBL control effect on brightness to a particular reduced level and associate that with the location designated as outdoors.

To prevent continuous changes to the effect of the DBL control of brightness when outdoor light varies, sometimes by a factor of up to 10× or more, the flow may proceed to 540. The DBL and ALS brightness control management system at 540 may then lock the effect on the ALS brightness control at 540. Then the DBL and ALS brightness control management system at 540 may then monitor for substantial location changes, substantial changes in ambient light levels such as would be experienced at dusk, or some combination, before proceeding to determine if reassessment of changes to control of the DBL control system or ALS control system are again necessary in some embodiments. Small movements at a location may not trigger a change. Nor will small fluctuations in detected ambient light levels. However, either or both monitored factors may need to reach a substantial level threshold amount of change to trigger a reassessment of conflict between the DBL control system and the ALS control system. For example, movement of location more than 50 feet or some other sufficient level of location change may trigger reassessment in some embodiments. In another example, changes in ambient light levels to above or below a DBL-ALS management threshold level may trigger reassessment. In some embodiments, a duration of time of a change in location or ambient light levels may need to be reached. For example, a change detected lasting longer than 10 seconds or some other duration may be determined before a reassessment is triggered at 540. Any sufficiency level of change in location or light levels may be utilized in various embodiments to trigger reassessment at 540 that balances between over fluctuation and responsiveness of the system to condition changes in ambient light levels.

Returning to 535, the DBL and ALS brightness control management system having determined that the ambient light level detected by an ALS sensor falls below a DBL-ALS low threshold will implement adjustments to the ALS control system to mitigate conflict between the DBL control system and the ALS control system. In the example embodiment at 535, the DBL and ALS brightness control management system may implement gradual change in reducing the effect of the ALS control system at low detected ambient light levels. For example, multiple low thresholds may determine a stepped down change in the effect of the ALS control system. For example, several DLB-ALS low threshold levels of ambient light may exist. Depending on the threshold levels of detected ambient light reached, a chart or other matrix may be accessed to determine by what percentage to reduce the effect or amount of brightness adjustments made by ALS control system. For example, if ambient light is detected at or below a first DBL-ALS low threshold such as a level of 200 lux, the effect of the ALS control operation to lower brightness in the digital display screen may be reduced by 50% in an embodiment. Further, the number steps for the brightness reduction amount conducted by the ALS control may be increased to limit the perceptible effect of the dimming by the ALS control under low light conditions. The dimming by the ALS control may be more granular in its change to brightness. In another example, if ambient light is detected at or below a second DBL-ALS low threshold such as a level of 100 lux, the effects of the ALS control operation to lower brightness in the digital display screen may be reduced by 75% in an embodiment. In yet another example, if ambient light is detected at or below a third DBL-ALS high threshold such as a level of 50 lux as with darkened room, the ALS control operation to reduce brightness in the digital display screen may be reduced by 100% or turned off in an embodiment. It is understood that any plurality of DBL-ALS low thresholds may be used that correspond to gradual step-down in effect of the DBL control system in reducing brightness.

In other aspects, change in DBL control effect may be reduced in proportion to the amount the ambient light reaches below the first low DBL-ALS management threshold level. The drop in ambient light levels may reach a capped saturation level of a detected low level of ambient light whereby the ALS control system is automatically turned off to eliminate its effect in some embodiments. The proportional reduction in effect of the ALS control system in this aspect may be a linear reduction of effect in one embodiment. In another embodiment, the reduction in effect of the ALS control system may be roughly asymptotic in that it will quickly approach complete shutdown of the ALS control system as lower levels of ambient light may be detected. The linear or asymptotic change in effect of brightness controls relative to detected ambient light levels measured beyond the DBL-ALS management threshold may be any linear or asymptotic relationship change in effects in various embodiments.

At this point, the DBL and ALS brightness control management system may revise the command from the ALS control to the back light power control system or another digital display brightness control system. A blended brightness adjustment command from effects of both the DBL control system and the ALS control system may be used by the DBL and ALS brightness control management system where applicable as well in some embodiments. In this way the DBL and ALS brightness control management system may reduce the effect of the ALS control system in the example embodiment. In other aspects, the DBL and ALS brightness control management system may eliminate the effect of one or the other DBL control system or ALS control system.

Also, the DBL and ALS brightness control management system may access a location history to determine from the low ambient light levels, from previous visits to a location, from time of day, or some combination, that the present location is an indoor location. Since ambient light levels may vary in indoor conditions due to interior lighting, new light sources, sources of shadows, or the like in an embodiment the DBL and ALS brightness control management system may settle the reduction of ALS control effect on brightness to a particular reduction level and associate that with the location as an indoor location.

To prevent continuous changes to the effect of the ALS control of brightness when indoor light varies, the flow may proceed to 540. The DBL and ALS brightness control management system at 540 may then lock the effect on the ALS brightness control. The DBL and ALS brightness control management system will monitor for substantial changes in location or in ambient light levels, such as would be experienced if one or more additional indoor lights were turned on, before proceeding to determine if changes to control of the DBL control system or ALS control system are again necessary in some embodiments. For example, changes of sufficient amounts in location or ambient light levels or changes of sufficient duration may be monitored at 540 as described with embodiments herein. In one example embodiment, an increase to ambient light levels up to 200 or 300 lux, a normal indoor room lighting level for example, may trigger a change at 540.

At 540, the DBL and ALS brightness control management system serves a monitoring role for changes in location or large changes in detected ambient light levels. The monitoring may be continuous in some embodiments. In other embodiments, periodic sampling or scheduled sampling may be conducted by the DBL and ALS brightness control management system. If a change is detected in location or sufficient ambient light levels to reflect a substantial change in ambient lighting condition, flow may return to 520 to assess whether a high DBL-ALS management threshold or a low DBL-ALS management threshold has been reached at 530 and flow may be conducted as before to manage the DBL control or ALS control. In some embodiments, to avoid fluctuation in brightness levels that would diminish the FOS experience, a change in location or ambient brightness level may need to be sufficiently different to trigger a reassessment as described in aspects herein. In other aspects, the DBL and ALS brightness control management system may also require at 540 that the change may need to be detected for a sufficient period of time or over a plurality of samples conducted of the ambient light levels or location.

If no change in location or substantial brightness level is detected at 540, flow may proceed to 545 to determine if the information handling system is being powered down or if the information handling system or digital display screen entering a sleep state. If not, flow may return to 540 to continue monitoring location or ambient light levels. If shut down or a sleep state is being entered, then flow may end.

Figure 6:
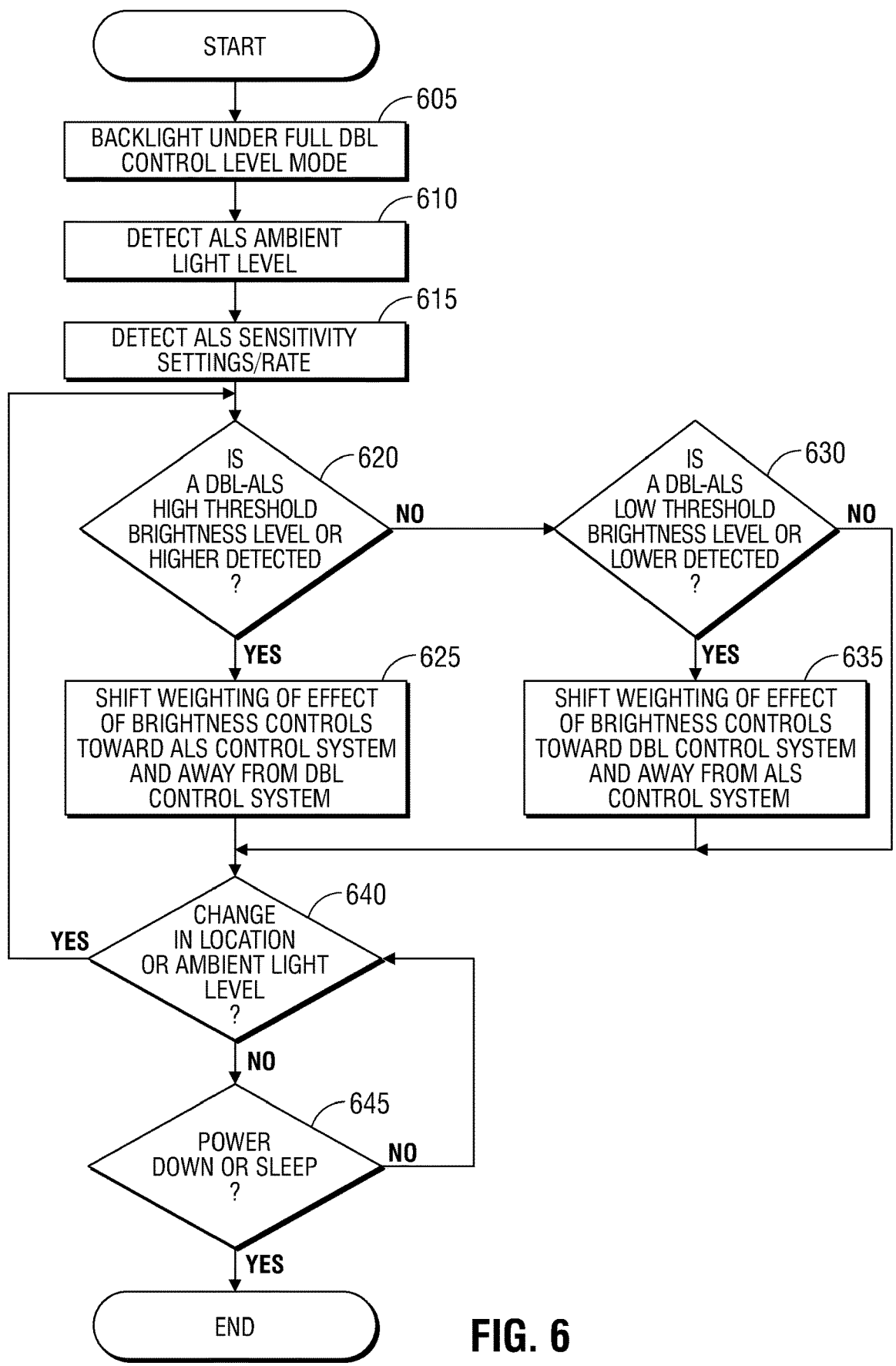
FIG. 6 is a flow diagram illustrating yet another method for managing brightness controls between a DBL control system and an ALS control system according to yet another embodiment of the present disclosure.

FIG. 6 is a flow chart illustrating yet another embodiment of the operation of a DBL and ALS brightness control management system. As shown in FIG. 6, the management between the competing automatic brightness control systems of the DBL control and the ALS control may not simply be an elimination of the effect of one or the other when a high or low DBL-ALS management control threshold has been met. In the present embodiment, the DBL control system and ALS control system may have weighting values assigned to each that determine the effect of each brightness control system at certain detected ambient light levels or at detected locations at certain times of day.

As discussed above, the DBL and ALS brightness control management system determines the state of the DBL brightness control system at 605. In an example embodiment, the DBL and ALS brightness control management system will detect the status of the DBL system as operating in full mode or at some applied weighting to its effect on the brightness control effect. As described in embodiments herein, the DBL control system functions as a content aware brightness and tone control for displayed information on a digital display device. In one aspect, the DBL and ALS brightness control management system may determine that the DBL control system is turned off if control of the DBL control system is manually modifiable in the information handling system. In the latter embodiment, the flow may end upon determination that the DBL control system is not active.

Upon the DBL and ALS brightness control management system determining the state of the DBL control system at 605, such as in a fully operational mode in an embodiment, the flow may proceed to 610. At 610, the DBL and ALS brightness control management system will detect an operational status of the ALS control system. As part of this status detection, an indication of detected ambient light levels from an ambient light sensor will be received. The ALS control system controls brightness adjustments based on high or low thresholds to avoid an overly bright digital display screen in darkened environments or to increase brightness at very high ambient light levels to permit viewability of the digital display screen as described in various embodiments herein. Detected ambient light levels may be used by the ALS control system, but also be used by the DBL and ALS brightness control management system to implement modifications to weighting between the DBL control system effect and the ALS control system effect on brightness levels of the digital display screen. The DBL-ALS thresholds to trigger management of weighting between the DBL control system and the ALS control system may be different or the same level as threshold trigger levels for the ALS control system in various embodiments as described.

At 615, the DBL and ALS brightness control management system will determine from the ALS control system or from stored information relating to the ALS control system operating policy, the sensitivity settings including amount of brightness change and rate of brightness change that will occur depending on the detected ambient light levels. Information about the sensitivity settings and brightness change rates may include an indication of one or more detected ambient light threshold levels to trigger a brightness change by the ALS control system. For example, high ambient brightness level threshold triggers and low ambient brightness level threshold triggers may be determined for the ALS control system. The behavior and parameters of the active ALS control system may be provided to the DBL and ALS brightness control management system as indications of sensitivity and change rates for brightness adjustments as described with various embodiments herein. Example ambient light levels for regular indoor ranges of operation as well as for high and low ALS control trigger thresholds are further discussed in various embodiments herein.

As with other embodiments, the DBL and ALS brightness control management system may operate with a semi-supervised machine learning system for brightness settings at 505, 510, and 515 to determine classification of user preferences and apply those to baseline settings for brightness levels, effect of various brightness control systems including the DBL control and ALS control systems, and settings for color compensation effects for color and brightness tone adjustments to accommodate personalized FOS experience. The semi-supervised machine learning system for brightness settings may be used to determine classification of user preferences based on both labelled datasets of known data aspects and unlabeled datasets collected about information handling system operation, user settings, and environment of the information handling system. Data in either labeled and unlabeled datasets may include information on locations or ambient light levels and anticipated conditions, operating environment including applications operating to display images, types of image requirements, battery or power statuses, necessary processing speeds for both graphics and other processing, and other aspect of the information handling system operation. The semi-supervised machine learning system for brightness settings may also work with determination of weighting, for example, of operation levels of the DBL control system as described in the embodiment herein. The semi-supervised machine learning for brightness may provide for settings for brightness or weighting levels of operation for brightness controls such as the DBL control system and the ALS control system in accord with determined user preference settings for better determination of improved FOS experience for users.

At 620, the DBL and ALS brightness control management system may determine whether the information handling system and digital display screen is at a location where a high detected ambient light level is or has been detected by an ALS sensor such that the ALS control and DBL controls may conflict. For example, the DBL and ALS brightness control management system may determine that outdoor daylight levels of light are occurring in the environment around the information handling system or digital display screen to determine at 620 that a conflict between the DBL and ALS control system may arise due to high ambient light levels. Accordingly, the detection of location with a history of high ambient light levels may assist in determining that the detected high ambient light levels may indicate an outdoor location requiring management between the DBL control system and the ALS control system. The detected ambient light level in one aspect, or an anticipated high ambient light level in another aspect, may be found to exceed a high DBL-ALS management threshold to trigger management of brightness controls between the DBL control system and the ALS control system. If a high DBL-ALS ambient light threshold has been exceeded, flow may proceed to 625.

At 625, the DBL and ALS brightness control management system may be triggered to curb the DBL control from interfering with the ALS control system efforts to increase brightness. If the DBL and ALS brightness control management system determines that the ambient light levels exceed the high DBL-ALS management threshold level at 620, the DBL and ALS brightness control management system determines a weighting apportionment between the brightness control effect of each of the DBL control system and ALS control system. The weighted brightness control effect altered by the DBL and ALS brightness control management system is sent to the backlight power control system. With a weighted brightness control signal, mitigation of the DBL control system effect at high ambient light levels may be implemented in concert with activation of the ALS control system.

At 625, the weighting assigned to each of the DBL control system and the ALS control system at regular ambient light levels below a high DBL-ALS management threshold, may be weighted evenly or at 50-50 in an example embodiment. However, upon reaching the high DBL-ALS management threshold, reducing the dimming effect of the DBL control system may become important to allow for a brighter digital display screen and a better FOS experience. In an example embodiment, at a high DBL-ALS management threshold of 500 lux ambient light levels may be a bright room but not so bright that it requires the ALS control system to even turn on in an embodiment. In another embodiment, at the high DBL-ALS management threshold, say of 1000 lux, may have turned on some effect of the ALS control system but not cranked the brightness levels of the digital display screen to maximum. In either case, a weighting adjustment from an even weighting split may be executed. Exceeding the high DBL-ALS management threshold may reduce the contribution of the DBL control system weighting and provide a corresponding increase in the effect of any ALS brightness control system. For example, the initial shift of weighting may be small depending upon where the high DBL-ALS management threshold level is set, when the ALS control system kicks in, and the viewability and brightness of the digital display screen type.

An initial weighting shift may be any amount in various embodiments. In one example embodiment, the weighting shift may occur as a linear shift depending on detected ambient light levels. The shift may start from a small adjustment, for example less than 1% increased weighting to the ALS control system at the high DBL-ALS management threshold and increase to a complete elimination of the effect of the DBL control system at a higher detected ambient light level where maximum brightness levels need to be implemented by the ALS control system. In another example embodiment, an asymptotic weight shifting may occur between the high DBL-ALS management threshold up to a capped high ambient light level at which full brightness may be needed. The capped high ambient light level may be, for example, a level of 10,000 lux in an example embodiment such as with full daylight conditions. However, this value will depend on the digital display screen characteristics. In yet another aspect, the weighting shift away from the DBL control system effect toward the ALS control system effect may be a stepped shift in some embodiments. For example, any number of steps may occur to shift from a few steps, for example 1 to 3 steps, to many steps. The stepped shifting may shift the weighting ultimately to 100% ALS control system effect and no DBL control system effect when the capped high ambient light level is detected that requires maximum brightness levels. Flow may proceed at this point to 640 where the DBL and ALS brightness control management system may monitor the information handling system and digital display screen or display screens for changes in location or ambient light levels sufficient to indicate a changed location or more permanent shift in ambient light levels.

Returning to 620, if the DBL and ALS brightness control management system determines that a high DBL-ALS management threshold has not been reached, then flow may proceed to 630. At 630, the DBL and ALS brightness control management system will determine if an ambient light level or a location history and time of day indicate that a low DBL-ALS management threshold level has been reached or ambient light levels have fallen below this low threshold.

At 630, if the DBL and ALS brightness control management system determines from a low detected ambient light level by an ALS sensor that low light levels fall below the low DBL-ALS management threshold level at 630, then flow may proceed to 635. At 635, the DBL and ALS brightness control management system may adjust the weighting away from the effect of the ALS control system.

The initial shift of weighting may be small depending upon where the low DBL-ALS management threshold level is set, when the ALS control system kicks in at low ambient light levels, and the viewability, brightness, and contrast capabilities of the digital display screen type.

At 630, an initial weighting shift at low ambient light conditions may also be any shift amount between the competing brightness controls in various embodiments. In one example embodiment, the weighting shift may occur as a linear shift starting from a small adjustment, for example less than 1% increased weighting to the DBL system at the low DBL-ALS management threshold and increasing to a complete elimination of the effect of the ALS control system at a capped lower detected ambient light level even lower than the low DBL-ALS management threshold level. At the capped lower detected ambient light level additional dimming to the digital display screen is not needed or detrimental. For example, over-dimming the digital display screen will make it difficult to view even very dark ambient light conditions. In another example embodiment, an asymptotic weight shifting may occur between the low DBL-ALS management threshold and the capped low ambient light level at which further dimming becomes unproductive. The capped low ambient light level may be, for example, a level of 100 lux in an example embodiment. However, this value will depend on the digital display screen characteristics such as contrast and other factors. In yet another aspect, the weighting shift away from the ALS control system effect toward the DBL control system effect may be a stepped shift in some embodiments. For example, any number of steps may occur to shift from just a few (1-3 steps) to many steps (tens or even hundreds or steps). Ultimately the stepped shift of weighing however will cause the DBL control system to have 100% weighting and sole effect on modifications to the digital display screen brightness levels when the capped low ambient light level is detected.

In an aspect, the DBL and ALS brightness control management system may provide a blended brightness adjustment control command to the back light power control system such as 215 or another digital display brightness control system. The blended brightness control command from the DBL and ALS brightness control management system will reflect the weighting applied shift between the DBL control system and the ALS control systems according to various embodiments herein.

Further in another aspect, the high DBL-ALS management threshold level or the low DBL-ALS management threshold levels may also be affected by a location determined via GNSS or other location system and the history of ambient light levels at that location recorded in previous visits by the information handling system or reported by other information handling systems that have travelled to a location in some embodiments. The DBL and ALS brightness control management system may determine from the detected ambient light levels, from previous visits to a location, from time of day, or some combination, that the present location is an outdoor location or an indoor location in various embodiments and susceptible to very high or very low ambient light levels. Since ambient light levels may vary in both indoor and outdoor conditions due to clouds, other light sources, shadows, or other factors, the DBL and ALS brightness control management system may determine a ratio of weighting between the ALS control system and the DBL control system effects on brightness and settle on that apportionment for either an indoor or outdoor location based on current samples of ambient light levels and previous recorded ambient light levels at that location or time of day.

To prevent continuous changes to the effect of the DBL control of brightness when outdoor light varies, sometimes by a factor of up to 10×, the flow may proceed to 640. The DBL and ALS brightness control management system at 640 may then monitor location, substantial changes in ambient light levels such as would be experienced at dusk, or with substantial changes to indoor lighting, or some combination, before proceeding to determine if changes to control of the DBL control system or ALS control system are again necessary in some embodiments. Various examples of sufficient changes to location, ambient light levels, or duration of changes are contemplated as with described examples herein.

Similarly, if at 630 the DBL and ALS brightness control management system determines from a low detected ambient light level by an ALS sensor that low light levels do not fall below the low DBL-ALS management threshold level at 630, then no modification may be made at this time to either the DBL control or the ALS control systems and flow may proceed to 640. Again, at 640 the DBL and ALS brightness control management system will continue monitoring the information handling system DBL control system and ALS control system for substantial changes in location or ambient light levels or status of activity of these brightness control systems.

At 640, the DBL and ALS brightness control management system serves a monitoring role for changes in location or large changes in detected ambient light levels. The monitoring may be continuous in some embodiments. In other embodiments, periodic sampling or scheduled sampling may be conducted by the DBL and ALS brightness control management system. If a change is detected in location or sufficient ambient light levels to reflect a substantial change in ambient lighting condition, flow may return to 620 to assess whether a high DBL-ALS management threshold or at 630 whether a low DBL-ALS management threshold has been reached. Flow may be conducted as before to manage the DBL control or ALS control. In some embodiments, to avoid fluctuation in brightness levels that would diminish the FOS experience, a change in location or ambient brightness level may need to be sufficiently different to trigger a re-assessment. In other aspects, the DBL and ALS brightness control management system may also require at 640 that the change may need to be detected for a sufficient period of time or over a plurality of samples conducted at the ambient light levels or location.

In another aspect, the DBL and ALS brightness control management system may also monitor whether either the DBL control system or the ALS control system is manually turned off by a user or by the system for other reasons. In such a case (not shown), the process may end.

If no change in location or substantial brightness level is detected at 640, flow may proceed to 645 to determine if the information handling system is being powered down or if the information handling system or digital display screen entering a sleep state. If not, flow may return to 640 to continue monitoring location or ambient light levels. If shut down or a sleep state is being entered, then flow may end.

The blocks of the flow diagrams in FIGS. 4, 5 and 6 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a dynamic backlight and ambient light sensor (DBL and ALS) brightness control management system comprising:
    a display screen having a selectable brightness level;
    a processor operatively connected to the display screen for executing code instructions of a dynamic backlight (DBL) control system configured to automatically modify brightness levels of some or all portions of the display screen in response to inputs relating to display content type and associated optimal contrast levels for the display content;
    the processor executing code instructions of an ambient light sensor (ALS) control system configured to automatically modify brightness levels of some or all portions of the display screen in response to detected ambient light levels of the information handling system independent of the DBL control system;
    the processor executing code instructions of the DBL and ALS brightness control management system to accept DBL control system brightness level modification and ALS control system brightness level modification and configured to determine whether the DBL control system brightness level modification and ALS control system brightness level modification conflict to adjust brightness levels above a high threshold brightness level or below a low threshold brightness level; and
    the processor configured to adjust operation of either the DBL control system brightness level modification or the ALS control system brightness level modification by shifting between limiting either the DBL control system brightness level modification or the ALS control system brightness level modification based on location or detected ambient light levels, wherein the adjustment to the DBL control system brightness level modification or the ALS control system brightness level modification prevents interfering impact by having both the DBL control system brightness level modification and the ALS control system brightness level modification applied on the display screen.

2. The information handling system operating the DBL and ALS brightness control management system of claim 1 wherein a gradual shift of brightness level while limiting either the DBL control system brightness level modification or the ALS control system brightness level modification is deployed in adjustment of operation of either the DBL control system brightness level modification or the ALS control system brightness level modification that follows a step progression of shift in brightness level of the display screen.

3. The information handling system operating the DBL and ALS brightness control management system of claim 1, further comprising:
    DBL and ALS brightness control management system to adjust operation of the DBL control system by shutting down the DBL control system brightness adjustments upon detection of an outdoors environment via a detected ambient light level exceeding a high DBL-ALS management threshold ambient light level.

4. The information handling system operating the DBL and ALS brightness control management system of claim 1, further comprising:

DBL and ALS brightness control management system to adjust operation of the DBL control system by shutting down the DBL control system brightness adjustments upon detection of an outdoors environment via a position detected by a Global Navigation Satellite System (GNSS).

5. The information handling system operating the DBL and ALS brightness control management system of claim 1, further comprising:
DBL and ALS brightness control management system to adjust operation of the DBL control system brightness level modification by gradually decreasing the weight of the DBL control system brightness adjustments to automatically control display screen brightness upon detection of an ambient light level exceeding a first high DBL-ALS management threshold ambient light level up to shutting down the DBL control system at a high ambient light level capped threshold.

6. The information handling system operating the DBL and ALS brightness control management system of claim 1, further comprising:
DBL and ALS brightness control management system to adjust operation of the ALS control system brightness level modification by shifting the weight of the ALS control system brightness adjustments to decrease the effect automatically adjust the brightness of the display screen relative to the DBL control system brightness adjustments based upon detection of a low light environment via a detected ambient light level falling below a low DBL-ALS management threshold ambient light level.

7. The information handling system operating the DBL and ALS brightness control management system of claim 1, further comprising:
DBL and ALS brightness control management system to adjust operation of the ALS control system brightness level modification by gradually decreasing the weight of the ALS control system brightness adjustments to the automatic display screen brightness upon detection of an ambient light level falling below a first low DBL-ALS management threshold ambient light level until a second low ambient light level capped threshold is reached where ALS control system is shut down to avoid further dimming.

8. A method for managing dynamic backlight and ambient light sensor (DBL and ALS) brightness control of an information handling system comprising:
emitting light from a display screen subject to full measures of DBL brightness control for automatically modifying brightness level of the display screen dependent upon detection of display content type for optimal contrast level;
receiving an ALS input indicating a first ambient light level to an ALS brightness control system for automatically modifying brightness level of the display screen to increase brightness with high levels of ambient light and dim brightness levels with low levels of ambient light, where the ALS brightness control system is independent of the DBL brightness control system;
determining, via a processor, the sensitivity of the ALS brightness control system indicating ALS brightness adjustment amounts based on detected ambient light;
executing, via the processor, a DBL and ALS brightness control management system to shift between limiting either the DBL control system brightness level modification or the ALS control system brightness level modification based on determining whether the DBL control system brightness level modification and ALS control system brightness level modification conflict to adjust brightness levels of the display screen above a high DBL-ALS management threshold ambient light level or below a low DBL-ALS management threshold ambient light level; and
performing a gradual shift reducing brightness control adjustment measures of the DBL control system upon the determination by the DBL and ALS brightness control management system that the information handling system is in an outdoor location.

9. The method for managing DBL and ALS brightness control of an information handling system of claim 8 wherein the gradual shift reducing brightness control adjustment measures of the DBL control system is an incremental shift at a rate of brightness steps over a duration of time that is less than a predefined noticeability rate of brightness change of the information handling system, and wherein the display screen has a fixed number of brightness steps over a display panel output range.

10. The method for managing DBL and ALS brightness control of an information handling system of claim 9 wherein the gradual shift reducing brightness control adjustment measures of the DBL control system includes a dynamic range of brightness steps to achieve complete shift based on contrast ratios needed for the detected ambient light environment.

11. The method for managing DBL and ALS brightness control of an information handling system of claim 10 further comprising:
accessing, via the processor operating the DBL and ALS brightness control management system, a weighting matrix describing policy shifting a ratio of brightness adjustment effect between the DBL control system and the ALS control system upon commencement of the gradual shift reducing brightness control adjustment measures of the DBL control system, wherein the ratio of brightness adjustment effect between the DBL control system and the ALS control system depends on the magnitude of detected ambient light above the high DBL-ALS management threshold ambient light level.

12. The method for managing DBL and ALS brightness control of an information handling system of claim 8 wherein an ALS control system must detect the first ambient light level at least equal to or above a high DBL-ALS management threshold ambient light level indicating an outdoor location to commence the gradual shift reducing brightness control adjustment measures of the DBL control system.

13. The method for managing DBL and ALS brightness control of an information handling system of claim 8 wherein upon determination that the information handling system is in an outdoor location, the DBL control system weight on affecting the brightness level of the display screen is reduced relative to the ALS brightness control system weight affecting the brightness level depending on detected ambient light at the outdoor location.

14. The method for managing DBL and ALS brightness control of an information handling system of claim 8 wherein the DBL and ALS brightness control management system determines an outdoor location based on a GPS location determination.

15. A computer implemented method for managing dynamic backlight and ambient light sensor (DBL and ALS) brightness control of an information handling system comprising:

emitting light from a display screen subject to full measures of DBL brightness control system for automatically modifying brightness level of the display screen dependent upon detection of display content type for optimal contrast level;

receiving an ALS input indicating a first ambient light level to an ALS brightness control system for automatically modifying brightness level of the display screen to increase brightness with high levels of ambient light and dim brightness levels with low levels of ambient light, where the ALS brightness control system is independent of the DBL brightness control system;

determining, via a processor, the sensitivity of the ALS control system indicating ALS brightness adjustment amounts based on detected levels of ambient light;

executing, via the processor, a DBL and ALS brightness control management system to accept DBL control system brightness level modification automatic instructions and ALS control system brightness level modification automatic instruction and shifting between limiting either the DBL control system brightness level modification or the ALS control system brightness level modification based on determining whether the DBL control system brightness level modification and ALS control system brightness level modification conflict to adjust brightness levels of the display screen above a high DBL-ALS management threshold ambient light level or below a low DBL-ALS management threshold ambient light level; and performing a gradual shift reducing brightness control adjustment measures by limiting the effect of the ALS brightness control system brightness level modification upon the determination by the DBL and ALS brightness control management system that the information handling system is in an environment with low ambient light conditions.

16. The method for managing DBL and ALS brightness control of an information handling system of claim 15 wherein the gradual shift reducing brightness control adjustment measures of the ALS control system brightness level modification is an incremental shift at a rate of brightness steps over a duration of time that is less than a predefined noticeability rate of brightness change of the information handling system, and wherein the display screen has a fixed number of brightness steps over a display panel output range.

17. The method for managing DBL and ALS brightness control of an information handling system of claim 16 further comprising:

accessing, via the processor operating the DBL and ALS brightness control management system, a weighting matrix describing policy shifting a ratio of brightness adjustment effect decreasing the automatic ALS control system brightness level modification relative to the automatic DBL control system brightness level modification upon commencement of the gradual shift reducing brightness control adjustment measures of the ALS control system brightness level modification, wherein the weighting matrix assigning the ratio of brightness adjustment effect between the DBL control system brightness level modification and the ALS control system brightness level modification depends on the magnitude of detected ambient light below the low DBL-ALS management threshold ambient light level.

18. The method for managing DBL and ALS brightness control of an information handling system of claim 15 wherein the ALS brightness control system must detect the first ambient light level at least equal to or below a first low DBL-ALS management threshold ambient light level for the DBL and ALS brightness control management system to commence applying a weighting factor to limit the ALS control system brightness level modification and the gradual shift reducing brightness control adjustment measures of the ALS control system brightness level modification.

19. The method for managing DBL and ALS brightness control of an information handling system of claim 15 wherein upon determination that the information handling system is in an indoor location, the DBL and ALS brightness control management system applies a weighting factor to the ALS brightness control system limiting the effect of the automatic brightness adjustment level to the display screen relative to the DBL brightness control system effect on the automatic brightness adjustment level on the display screen.

20. The method for managing DBL and ALS brightness control of an information handling system of claim 19 wherein the DBL and ALS brightness control management system determines an indoor location based on a GPS location determination.

* * * * *